US012750217B2

(12) United States Patent
Hamburg et al.

(10) Patent No.: US 12,750,217 B2
(45) Date of Patent: Sep. 29, 2026

(54) SIGN-EFFICIENT ADDITION AND SUBTRACTION FOR STREAMING COMPUTATIONS IN CRYPTOGRAPHIC ENGINES

(71) Applicant: Cryptography Research, Inc., San Jose, CA (US)

(72) Inventors: Michael Alexander Hamburg, Laguna Beach, CA (US); Lauren De Meyer, Heverlee (BE); Arvind Singh, Dublin, CA (US)

(73) Assignee: Cryptography Research, Inc., San Jose, CA (US)

( * ) Notice: Subject to any disclaimer, the term of this patent is extended or adjusted under 35 U.S.C. 154(b) by 132 days.

(21) Appl. No.: 17/865,036

(22) Filed: Jul. 14, 2022

(65) Prior Publication Data

US 2023/0042366 A1 Feb. 9, 2023

Related U.S. Application Data

(60) Provisional application No. 63/203,471, filed on Jul. 23, 2021.

(51) Int. Cl.

| | |
|---|---|
| ***H04L 29/06*** | (2006.01) |
| ***G06F 7/491*** | (2006.01) |
| ***H04L 9/30*** | (2006.01) |

(52) U.S. Cl.
CPC .............. *H04L 9/30* (2013.01); *G06F 7/4912* (2013.01); *G06F 7/4915* (2013.01)

(58) Field of Classification Search
CPC ......... H04L 9/30; H04L 9/3066; H04L 12/08; G06F 7/4912; G06F 7/4915; G06F 7/728; G06F 7/50; G06F 7/4806; G06F 7/483; G06F 7/4836; G06F 2207/3808; G06F 2207/3812; G06F 2207/3816; G06F 2207/4835; G06F 2212/7209; G06F 7/49; G06F 7/74; G06F 11/076; G06F 2207/382; G06F 7/722; G06C 17/00; H03M 1/26; H03M 13/6577; H03M 3/02; H03M 13/21; H04B 1/0021; H04B 14/062; H04N 5/9261; H04N 9/8042; G05B 2219/13069; G05B 2219/15127; G11B 20/00746; H01H 2239/026
See application file for complete search history.

(56) References Cited

U.S. PATENT DOCUMENTS

| | | | | |
|---|---|---|---|---|
| 5,414,651 | A | 5/1995 | Kessels | |
| 2005/0084099 | A1 * | 4/2005 | Montgomery | G06F 7/728 380/28 |
| 2019/0004770 | A1 * | 1/2019 | Satpathy | H04L 9/3252 |

* cited by examiner

*Primary Examiner* — Edward Zee
*Assistant Examiner* — Leynna Truvan

(57) ABSTRACT

Aspects of the present disclosure involve techniques and cryptographic processors configured to perform the techniques that include sign-efficient addition and subtraction operations that use Montgomery reduction and are capable of facilitating fast streaming operations. The techniques involve receiving a first number and a second number, where the first number and second number are within a target interval, and performing a modular operation to obtain a third number, the third number being within the same target interval and representing a sum or a difference of a rescaled first number and a rescaled second number, and wherein the modular operation includes a Montgomery reduction.

20 Claims, 5 Drawing Sheets

SIGN-EFFICIENT ADDITION AND SUBTRACTION FOR STREAMING COMPUTATIONS IN CRYPTOGRAPHIC ENGINES

RELATED APPLICATIONS

This application claims the benefit of U.S. Provisional Patent Application No. 63/203,471, filed Jul. 23, 2021, which is hereby incorporated herein by reference.

TECHNICAL FIELD

The disclosure pertains to cryptographic computing applications, more specifically to improving efficiency of cryptographic operations using addition/subtraction processing units that utilize Montgomery reduction techniques for improving streaming computations.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
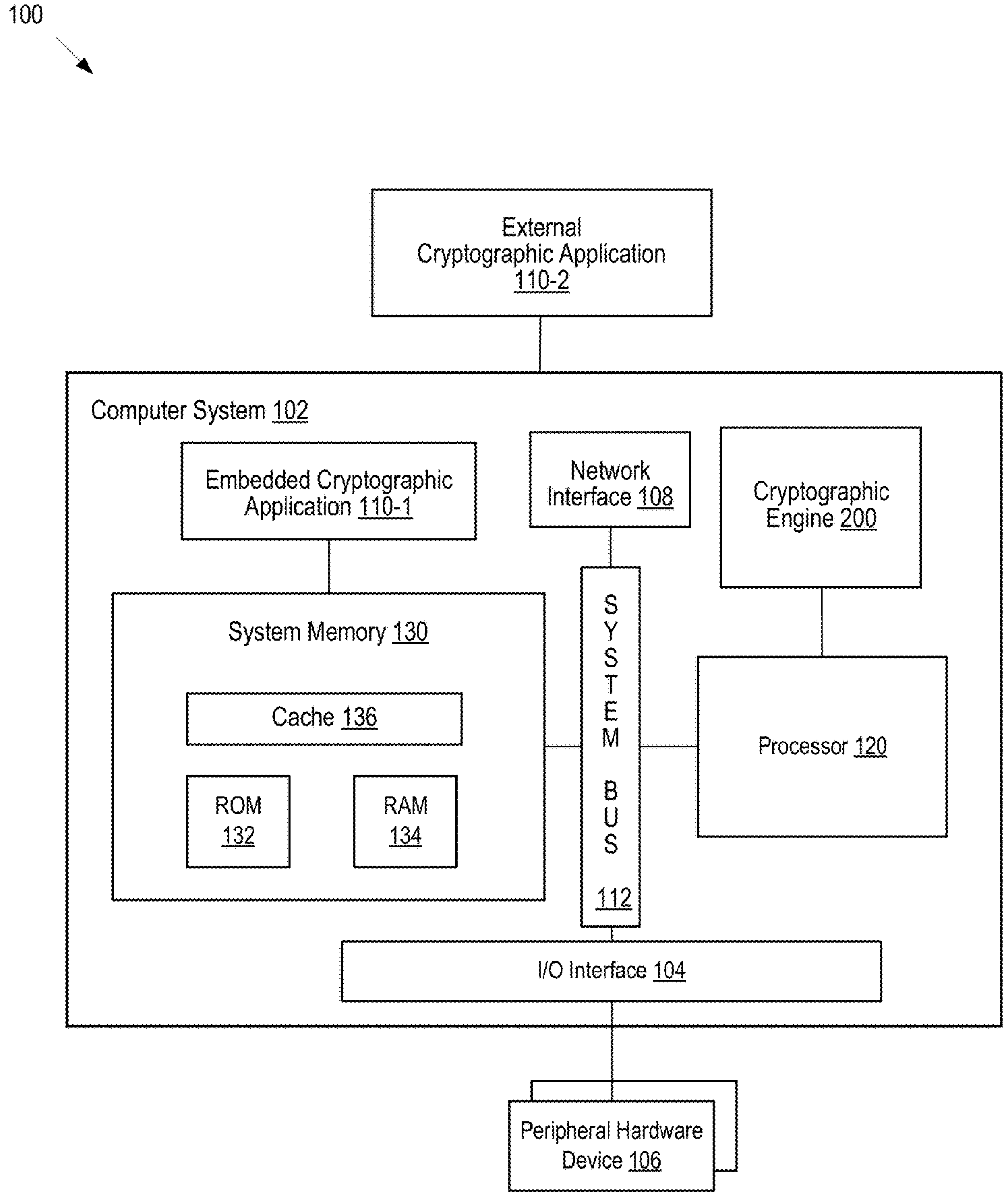
FIG. 1 is a block diagram illustrating an example system architecture in which implementations of the present disclosure may operate.

Aspects of the present disclosure are directed to hardware cryptographic engines for improving computational efficiency and memory utilization in cryptographic applications that include, but are not limited to, public-key cryptography operations. More specifically, aspects of the present disclosure are directed to efficient streaming processing of public key and private key operations, key generation, modular multiplication, Montgomery multiplication, modular inversion, elliptic curve cryptographic operations, and numerous other cryptographic applications.

Various cryptographic applications may involve operations that are efficiently performed by offloading them from a main processor to a dedicated cryptographic engine (accelerator) that includes hardware circuits designed to improve speed and efficiency of arithmetic operations (multiplication, division, addition, etc.) and memory accesses. For example, in Rivest-Shamir-Adelman (RSA) public key/private key applications, large prime numbers p and q may be selected to generate a pair of a public (encryption) exponent e and a secret (decryption) exponent d such that e and d are inverse of each other modulo a certain number. The encryption exponent and the product $p \cdot q$ may be revealed as part of the public key while the numbers p, q, and the decryption exponent d are stored in secret as parts of the private key. A message may be encrypted using modular exponentiation based on the product $p \cdot q$ and the encryption exponent and may be decrypted using the private exponent d. To prevent unauthorized actors from recovering the private exponent d, the prime multipliers p and q are typically selected to be large numbers, e.g., 1024-bit numbers.

Some applications use elliptic curve cryptography that involves operations with points (x,y) on an elliptic curve, e.g., an elliptic Weierstrass curve, $y^2=x^3+ax+b$. Arithmetic operations (such as addition, doubling, and infinity operations) are defined via a set of geometric rules; e.g., a sum of three points on an elliptic curve is zero, $P_1+P_2+P_3=0$, if the points $P_1$, $P_2$, $P_3$ are located at the intersection of the elliptic curve with a straight line. The strength of the elliptic curve cryptography is based on the fact that for large values of k, a product $Q=P \cdot k$ can be practically anywhere on the elliptic curve. As a result, the inverse operation to determine an unknown value of (e.g., private key) k from a known public value Q can be a prohibitively difficult computational operation. In elliptic curve cryptography applications, 256-bit numbers are often used.

Decryption and encryption operations often require performance of a large number of arithmetic operations, which may take many clock cycles, especially when performed on low-bit microprocessors, such as smart card readers, wireless sensor nodes, and so on. Cryptographic engines (accelerators, co-processors) are specially designed circuits that execute specialized computationally intensive cryptographic operations more efficiently than a general purpose processor. Because in many applications (including network and cloud applications) cryptographic operations may constitute a significant portion of the total computational load, small and efficient cryptographic engines are highly desired.

Various cryptographic computations are often performed modulo some number p, which is often selected to be a prime number. Modular arithmetic operations may involve a reduction step of bringing an intermediate result to the interval $[0, p-1]$. The number of computational operations, required to perform such reduction steps, may add up quickly and increase the computational costs of cryptographic algorithms. Fewer operations may be needed to reduce results of intermediate computations to an expanded interval $[0, 2p-1]$ or to a more symmetric interval $[-p, p-1]$, with the most significant bit of the number being interpreted as the sign of the number (e.g., 0 indicating a positive sign and 1 indicating a negative sign). Addition (or subtraction) operations of numbers (e.g., x and y) within such interval may be performed based on the relative sign of the numbers. For example, if during an addition operation it is determined that the sign bits of x and y are opposite (e.g., XOR addition of the sign bits yields 1), the sum x+y is within the $[-p, p-1]$ interval. If the signs of the numbers are both negative, adding modulus p to the sum x+y ensures that the number x+y+p is within the target interval $[-p, p-1]$. If the signs of the numbers are both positive, subtracting modulus p from the sum x+y ensures that the number x+y−p is within the target interval $[-p, p-1]$. Similarly, by an appropriate addition or subtraction of p, based on the values of the sign bits of x and y, a subtraction operation x−y may be performed with the output being within the target interval. As a result, modular addition or subtraction may be executed without comparing the result $x \pm y$ to the modulus number p. Techniques in which values are reduced mod p, but to intervals with more than p elements, are called "non-canonical reduction" because the same value mod p may have more than one possible representation it is not reduced to a single canonical representation.

In some cryptographic engines, a sign of x and/or y may not be available until some time that occurs during later cycles of a cryptographic operation. For example, one of the numbers x or y (or both) may be output by a previous, e.g., multiplication, operation. Multiplication operation may be performed in a streaming fashion, with the multiplication unit processing the least significant bits or words (groups of bits) of multiplier and multiplicand first (e.g., as in the schoolbook multiplication algorithm) and processing the most significant bits or words last. Because the sign of a modular multiplication (the most significant bit) may not be known until all bits of the multiplier and multiplicand are processed, a subsequent addition operation may need to wait until the last cycle of the multiplication operation. This creates a computational bottleneck and increases latency. To remove the bottleneck, the processing has to be modified in a way that brings the number x±y (or some other number that represents ±y) within the target interval [−p, p−1] regardless of the signs of x and y. The combination (x±y)/2 satisfies the desired conditions when the numbers x and y have the same parity, but not when one of the numbers is even and the other number is odd (which happens in 50% of the instances).

Aspects and implementations of the present disclosure describe a method and cryptographic accelerators capable of performing the method of efficient addition and subtraction of numbers that can be performed in a streaming fashion, starting with the least significant bits of the addends without waiting for the more significant bits to be output by preceding operations. In some implementations, the sum or difference x±y of the input numbers may be modified by a product of a Montgomery factor m, which depends on x and y, and the modulus p. This may place the sum (or difference) within an expanded interval [−Rp, R(p−1)], where R is a predefined integer (Montgomery radix). A subsequent reduction by R brings the output within the target interval [−p, p−1] regardless of the sign of x and y. The described techniques allow processing of addition and subtraction operations in a streaming fashion, starting from the least significant bits, and avoid delaying operations until all words of x and y are available. Various implementations of efficient additions/subtractions with Montgomery reduction are described below in conjunction with cryptographic processors capable of performing such operations.

FIG. 1 is a block diagram illustrating an example system architecture 100 in which implementations of the present disclosure may operate. The example system architecture 100 may be a desktop computer, a tablet, a smartphone, a server (local or remote), a thin/lean client, and the like. The example system architecture 100 may be a smart a card reader, a wireless sensor node, an embedded system dedicated to one or more specific applications (e.g., cryptographic applications 110-1 and 110-2), and so on. The system architecture 100 may include, but need not be limited to, a computer system 102 having one or more processors 120, e.g., central processing units (CPUs), capable of executing binary instructions, and one or more memory devices 130. "Processor" refers to a device capable of executing instructions encoding arithmetic, logical, or I/O operations. In one illustrative example, a processor may follow Von Neumann architectural model and may include one or more arithmetic logic units (ALUs), a control unit, and a plurality of registers.

The system architecture 100 may further include an input/output (I/O) interface 104 to facilitate connection of the computer system 102 to peripheral hardware devices 106 such as card readers, terminals, printers, scanners, internet-of-things devices, and the like. The system architecture 100 may further include a network interface 108 to facilitate connection to a variety of networks (Internet, wireless local area networks (WLAN), personal area networks (PAN), public networks, private networks, etc.), and may include a radio front end module and other devices (amplifiers, digital-to-analog and analog-to-digital converters, dedicated logic units, etc.) to implement data transfer to/from the computer system 102. Various hardware components of the computer system 102 may be connected via a system bus 112 that may include its own logic circuits, e.g., a bus interface logic unit (not shown).

The computer system 102 may support one or more cryptographic applications **110-*n*, such as an embedded cryptographic application 110-1 and/or external cryptographic application 110-2. The cryptographic applications 110-*n* may be secure authentication applications, encrypting applications, decrypting applications, secure storage applications, and so on. The external cryptographic application 110-2 may be instantiated on the same computer system 102, e.g., by an operating system executed by the processor 120 and residing in the memory device 130. Alternatively, the external cryptographic application 110-2 may be instantiated by a guest operating system supported by a virtual machine monitor (hypervisor) executed by the processor 120. In some implementations, the external cryptographic application 110-2 may reside on a remote access client device or a remote server (not shown), with the computer system 102** providing cryptographic support for the client device and/or the remote server.

The processor 120 may include one or more processor cores having access to a single or multi-level cache and one or more hardware registers. In implementations, each processor core may execute instructions to run a number of hardware threads, also known as logical processors. Various logical processors (or processor cores) may be assigned to one or more cryptographic applications 110, although more than one processor core (or a logical processor) may be assigned to a single cryptographic application for parallel processing. A multi-core processor 120 may simultaneously execute multiple instructions. A single core processor 120 may typically execute one instruction at a time (or process a single pipeline of instructions). The processor 120 may be implemented as a single integrated circuit, two or more integrated circuits, or may be a component of a multi-chip module.

The memory device 130 may refer to a volatile or non-volatile memory and may include a read-only memory (ROM) 132, a random-access memory (RAM) 134, high-speed cache 136, as well as (not shown) electrically erasable programmable read-only memory (EEPROM), flash memory, flip-flop memory, or any other device capable of storing data. The RAM 134 may be a dynamic random-access memory (DRAM), synchronous DRAM (SDRAM), a static memory, such as static random-access memory (SRAM), and the like. Some of the cache 136 may be implemented as part of the hardware registers of the processor 120. In some implementations, the processor 120 and the memory device 130 may be implemented as a single field-programmable gate array (FPGA).

The computer system 102 may include a cryptographic engine (processor, co-processor, accelerator. etc.) 200 for fast and efficient performance of cryptographic computations, as described in more detail below. Cryptographic engine 200 may include processing and memory components, as described in more detail below. Cryptographic engine 200 may perform authentication of applications, users, access requests, in association with operations of the cryptographic applications 110-*n* or any other applications operating on or in conjunction with the computer system 102. Cryptographic engine 200 may further perform encryption and decryption of secret data.

Figure 2:
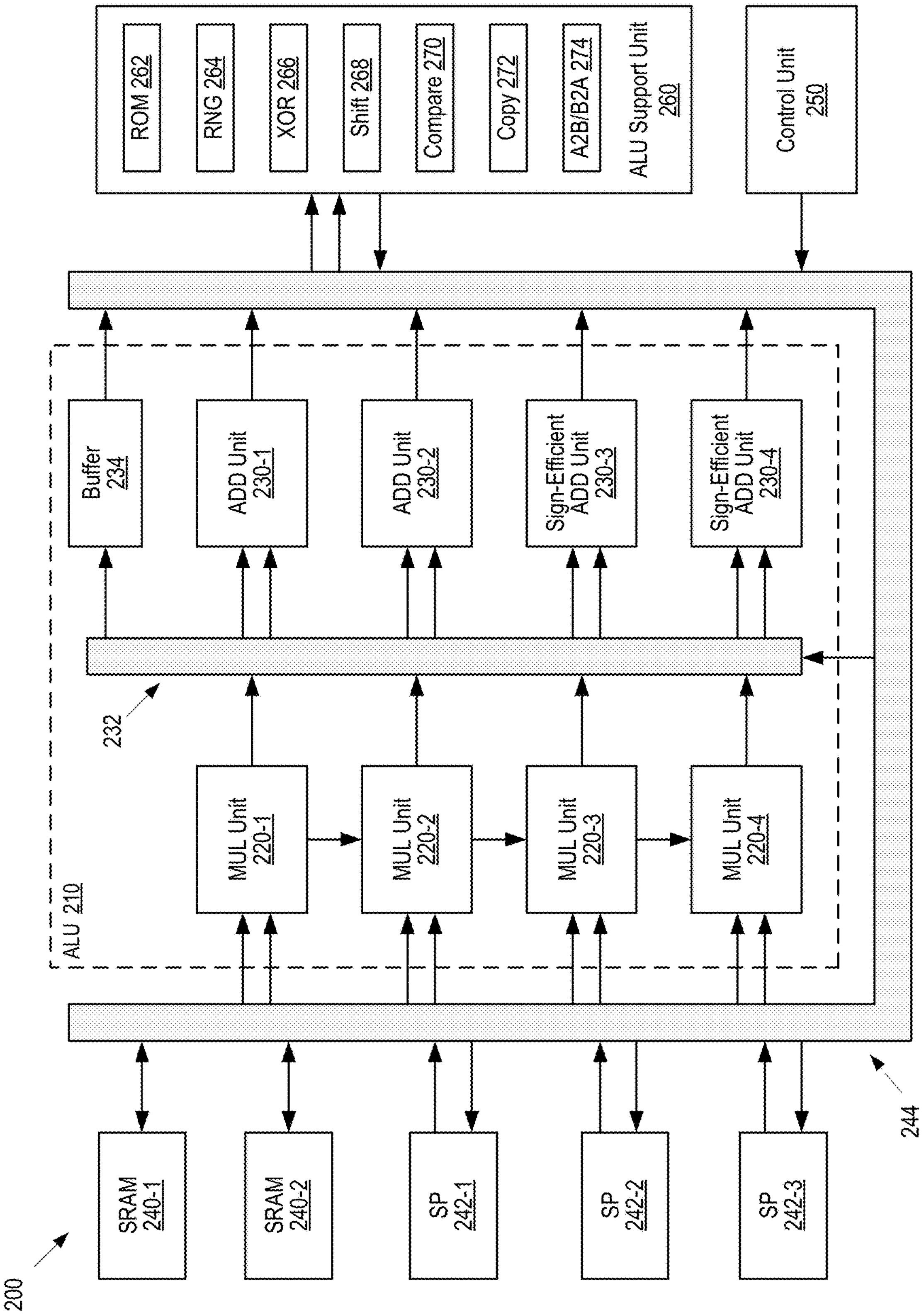
FIG. 2 is a block diagram illustrating an example cryptographic engine operating in accordance with some implementations of the present disclosure.

FIG. 2 is a block diagram illustrating an example cryptographic engine 200 operating in accordance with some implementations of the present disclosure. Cryptographic engine 200 may include an arithmetic logic unit (ALU) 210 having a number of multiplication (MUL) units 220-*n*. Shown are four MUL units 220-1 . . . 220-4 even though ALU 210 may include fewer than four (e.g., two) or more than four (e.g., eight) MUL units. ALU 210 may also have a number of addition (ADD) units 230. Shown are four ADD units 230-1 . . . 230-4 even though in various implementation, ALU 210 may have two ADD units, three ADD units, or more than four ADD units. (Herein, the addition operations should also be understood to include subtraction operations, whenever applicable.) In some implementations, ALU 210 may further include a buffer 234 to store a number over a duration of a computational cycle. In some implementations, buffer 234 may have one input and may operate similarly to an addition circuit that adds zero to the input number. MUL units 220-*n*, ADD units 230-*n*, and buffer 234 may be connected to an ALU bus 232 that communicates data (e.g., input and output numbers) between any of MUL units 220-*n* and any of ADD units 230-*n* and/or buffer 234. Some of the addition units may be sign-efficient (SE) ADD units configured to perform Montgomery-reduced addition (and subtraction), as described in more detail in conjunction with FIG. 3. For example, shown in FIG. 2 are two SE ADD units 230-3 and 230-4 although any number of SE ADD units may be present. In some implementations, all ADD units 230-*n* may be SE ADD units or may be reversibly configured, by control unit 250, as SE ADD units.

Cryptographic engine 200 may further include a number of memory circuits, such as static random-access memory (SRAM), e.g., SRAM 240-1 and 240-2, and scratchpad memory (SP), such as 242-1, 242-2, and 242-3. Even though two SRAM and three SP are shown in FIG. 2, in some implementations, any other number of memory circuits may be present. Each SRAM may be used to load one number per cycle (e.g., an N-bit word) or store one number per cycle (as indicated by bidirectional arrows associated with each SRAM). Each SP may be a two-port memory circuit that can be used to load one number and store one number per cycle (as indicated by two separate arrows associated with each SP). Each of MUL units 220-*n*, ADD units 230-*n*, buffer 234, SRAM 240-*n*, and SP 242-*n* may be connected to bus 244. Bus 244 may include a number of data communication lines (data bus) for transferring data (input and output numbers) between the aforementioned circuits. Additionally, bus 244 may include an address bus for communicating signals that identify source and destination of data. Bus 244 may also include a control bus, e.g., lines for communicating control signals from a control unit 250. Control unit 250 can include a clock to maintain cycles of computations and memory access operations. Control unit 250 may store instructions the cryptographic engine to perform various cryptographic computation, control unit 250 may be programmable, e.g., by an external processor, such as processor 120 of FIG. 1. In some implementations, processor 120 may execute one or more cryptographic applications 210-*n* and select a method of cryptographic protection to be used in connection with the executed cryptographic application(s). Methods of protection may include RSA algorithms, ECC algorithms, Data Encryption Standard (DES) algorithms, Advanced Encryption Standard (AES) algorithms, and so on. Processor 120 may select data to be encrypted or decrypted, identify cryptographic keys to be used, and so on. Processor 120 may provide instructions to control unit 250 to configure control unit 250 to provide cryptographic support for the application(s) executed by processor 120. Using instructions received from processor 120, control unit 250 may identify the type and the amount of operations to be performed by ALU 210, the size of the number to be multiplied, and so on. Control unit 250 may also fetch specific instructions (e.g., from memory of the cryptographic engine 200 or system memory 130) to support various operations to be performed by ALU 210.

Each of the MUL units 220-*n* and ADD units 230-*n* may be a circuit that operates on N-bit words (e.g., 64-bit inputs or inputs of any other suitable size) and may have at least two inputs (indicated by horizontal arrows). Additionally, MUL units 220-1 . . . 220-3 may stream outputs (as well as inputs, in some instances) of multiplications performed by the respective circuits as inputs into subsequent MUL units 220-2 . . . 220-4 (as depicted by the downward arrows). For example, an output of MUL unit 220-1 may be provided to the next MUL unit 220-2 or to the ALU bus 232. From ALU bus 232 the outputs of multiplications may be delivered to any of the ADD units 230-*n* (or buffer 234) or any of the memory circuits (SRAM 240-*n* or SP 242-*n*). In some instances, when an addition operation involves a number that is not an output of a previous multiplication operation, an input into an addition operation may be delivered via bus 244 from one of the memory circuits 240-*n* or 242-*n* (as depicted by the upward arrow between bus 244 and ALU bus 232).

An additional ALU support unit 260 may include circuits that perform operations different from multiplications or additions. ALU support unit 260 may include a read-only memory (ROM) 262, which may store constants (such as modulus p, Montgomery radix R, numbers $R^{-1}$ mod p, etc.), various instructions for control unit 250, and so on. ALU support unit 260 may further include a random number generator (RNG) 264 for generation of random (or pseudo-random) numbers, an XOR unit 266 for performing XOR operations, a shift unit 268 to perform bit shifting and bit masking, a compare unit 270 to perform comparison of input numbers, a copy unit 272 for copying numbers, an arithmetic-to-Boolean and/or Boolean-to-arithmetic conversion (A2B/B2A) unit 274. The A2B/B2A unit 274 may be used for handling keys and other secret data that is stored in masked Boolean or masked arithmetic form (e.g., as a plurality of randomized values whose Boolean or arithmetic sum, difference, etc. represents a secret value). For example, A2B/B2A unit 274 may convert data stored in a Boolean-masked form to an arithmetic-masked form (if a cryptographic application is configured to process data in the latter form), and/or vice versa. ALU support unit 260 may also include other auxiliary units (circuits) performing various functions that may be used in operations of cryptographic engine 200.

The cryptographic engine 200 may be capable of performing streaming computations in which results of various operations (e.g., multiplications, additions, subtractions, etc.) are streamed into a subsequent operation before the previous operation is completed. For example, a multiplication X·Y may be computed by splitting the multiplier (and/or, similarly, the multiplicand) into words (e.g., 32-bit words, 64-bit words, etc.) $X_j$, e.g. $X=\Sigma_j X_j \cdot w^j$, where $w=2^N$ is the size of one word. The product $Z=X\cdot Y$ may be computed starting with low words of the multiplier, $X_0, X_1 \ldots$ and low words of the multiplicand $Y_0, Y_1 \ldots$, and determining the product Z in the order of increased significance of its words, $Z_0, Z_1 \ldots$. For example, $Z_0$ may be determined as the low word of the product $X_0\cdot Y_0$; similarly, $Z_1$ may be determined as the low word of the product $X_0\cdot Y_1+X_1\cdot Y_0$ (plus the high word carry of the product $X_0\cdot Y_0$), and so on. Streaming processing allows to use the words of the product $Z_0, Z_1 \ldots$ in subsequent operations before more senior words of the same product are identified. For example, MUL unit 220-1 may be computing $Z=X\cdot Y$ and providing (streaming) the words of the product to a next processing unit, e.g., SE ADD unit 230-3 or MUL unit 220-2.

Figure 3:
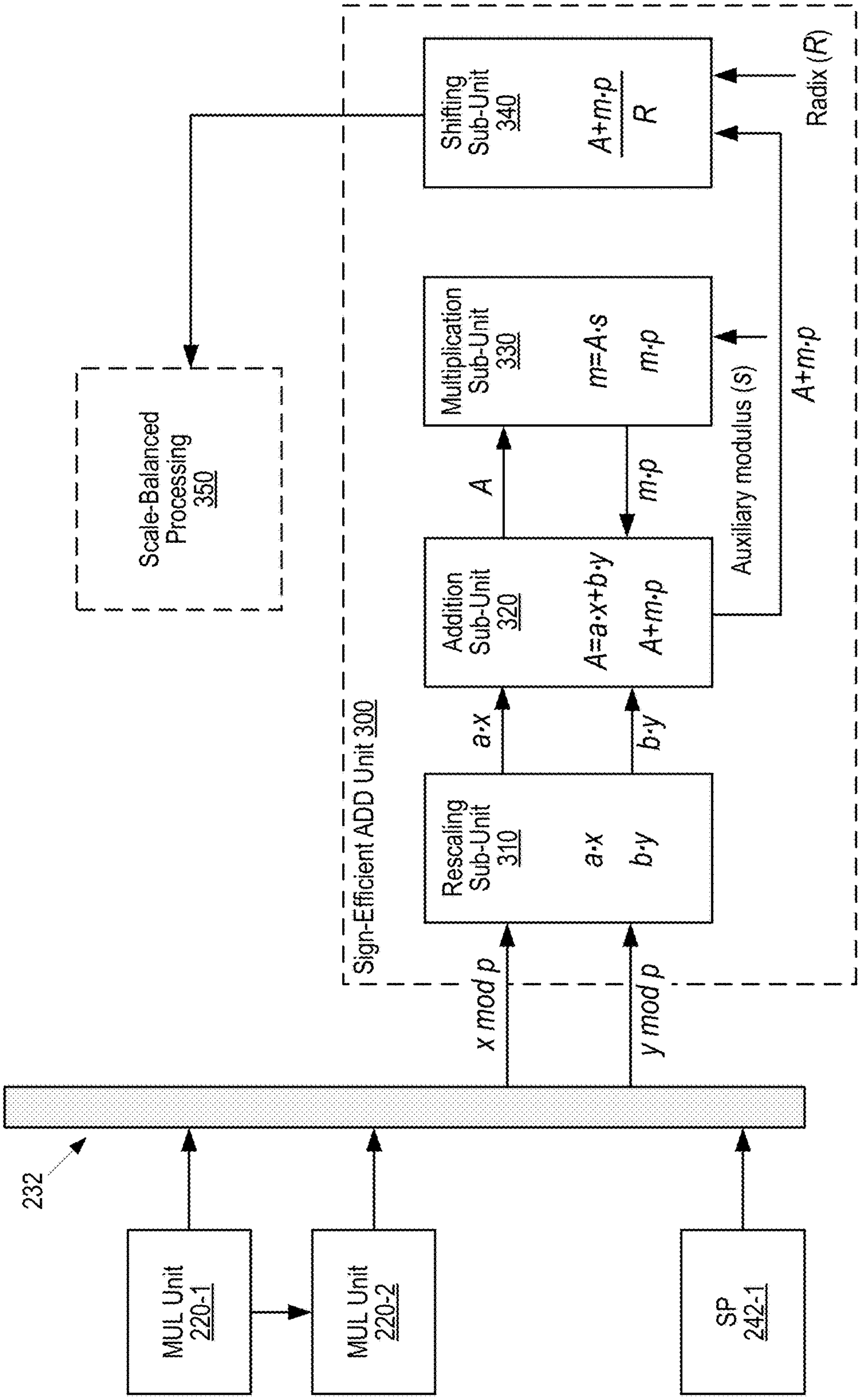
FIG. 3 is a block diagram illustrating a portion of a cryptographic engine that may perform efficient addition and subtraction using Montgomery reduction for facilitation of streaming computations, in accordance with some implementations of the present disclosure.

FIG. 3 is a block diagram illustrating a portion of a cryptographic engine that may perform efficient addition and subtraction using Montgomery reduction for facilitation of streaming computations, in accordance with some implementations of the present disclosure. Shown is a sign-efficient (SE) ADD unit 300 (which may be one of ADD units 230-*n* or a separate ADD unit not shown in FIG. 2) which may receive numbers x and y from ALU bus 232. At least one of the numbers x and y may be output by one of MUL units 220-*n*, e.g., MUL unit 220-1 or MUL unit 220-2 while the other number may be output by another MUL unit or loaded from one of memory units, e.g., SP 242-1. In those instances where both x and y and loaded from memory and the signs of the numbers x and y are known beforehand (e.g., from the most significant bits of the respective numbers), the addition may instead be performed as $x+y-(\mathrm{sgn}(x)+\mathrm{sgn}(y))\cdot p/2$ and the subtraction as $x-y-(\mathrm{sgn}(x)-\mathrm{sgn}(y))\cdot p/2$; here $\mathrm{sgn}(x)=+1$ for $x\geq 0$ and $\mathrm{sgn}(x)=-1$ for $x<0$. In some implementations, even when both x and y are loaded from memory, for the uniformity of computational operations and data flow, the addition and subtraction operations may still be performed as described below. For the sake of specificity, the operations below are illustrated using an example addition, but it will be understood that substantially similar operations (e.g., with the change $y\to -y$ implied) are to be performed in the instances of subtraction operations.

The numbers input into SE ADD unit 300 may be mod p numbers. Numbers x and y may be streamed into SE ADD unit 300. Each number modulo p may be represented by k bits (e.g., k=128, 256, 1024, etc.), with $2^k>p$:

$$x=\sum_{j=0}^{k-1} x_j\cdot 2^j.$$

This provides for x to be contained in the interval [0, p−1]. The bit size k may instead be chosen so that $2^k>2p$, or some other multiple of p, so that a faster, non-canonical reduction algorithm can be used without exceeding the representation's bit size. Additionally or alternatively, x may be encoded in a 2's complement signed representation, so that the interval used may be negative, e.g.

$$\left[\frac{1-p}{2}, \frac{p-1}{2}\right]$$

or [−p, p−1] instead of [0, p−1] or [0, 2p−1]. In 2's complement notation, the most significant bit $x_{k-1}$ is treated as the sign bit, meaning that $$x=-x_{k-1}\cdot 2^{k-1}+\sum_{j=0}^{k-2} x_j\cdot 2^j.$$

Rescaling sub-unit 310 may receive the input numbers and may optionally multiply (rescale) each input number by some power of 2, e.g., $x\to a\cdot x$; $y\to b\cdot y$, where $a=2^\alpha$ and $b=2^\beta$. In some implementations, rescaling unit 310 may include one or more shift registers and the rescaling may be performed by shifting x by a bits to the left and by shifting y by β bits to the left. As depicted schematically in FIG. 3, rescaled values $a\cdot x$ and $b\cdot y$ may be input into addition sub-unit 320 which may add the rescaled numbers, $A=a\cdot x+b\cdot y$ and provide the sum A to multiplication sub-unit 330. The sum A may be defined on the interval $[-(a+b)\cdot p, (a+b)\cdot p-1]$. A multiplication sub-unit 330 may determine a Montgomery factor for the sum A. More specifically, the multiplication sub-unit 330 multiplies the sum A by an auxiliary number s modulo a Montgomery radix R. The Montgomery radix R may be a power of 2, e.g., $R=2^r$. The bit size r of the radix may be less than the size of a word of x and/or y. For example, if the size of the word of x and/or y is 32 bits, 64 bits, etc., radix may be R=2, 4, 8, 16, etc. The auxiliary number s is selected such that $1+ps=R\cdot n$, where n is some integer number. The auxiliary number s may be pre-stored (e.g., in a buffer) in the multiplication sub-unit 330 or loaded from memory. (In some implementations, only the low r bits of the auxiliary number s are stored.) The multiplication sub-unit 330 may compute the Montgomery reduction factor $m=A\cdot s \bmod R$, e.g., by computing the low r bits of $A\cdot s$. The reduction factor m, defined on the interval [0, R−1], may be also be interpreted as a 2's complement defined on the interval [−R/2, R/2−1]. In some implementations, as depicted in FIG. 3, the multiplication sub-unit 330 may be a part of SE ADD unit 300. In some implementations, the function of the multiplication sub-unit 330 may be performed by any of MUL units 220-*n*, with a control sub-unit of SE ADD 300 (not explicitly depicted in FIG. 3) or control unit 250 directing data from/to addition sub-unit 320 for multiplication processing.

The multiplication sub-unit 330 may then compute the product of the reduction factor and the modulus: $m\cdot p$. (In some implementations, only the high $k\geq r$ bits of the product $m\cdot p$ are computed.) The computed product may then be provided back to the addition sub-unit 320 where the sum $A+m\cdot p$ may be computed. This sum is divisible by radix R since, by construction, $1+p\cdot s=0 \bmod R$. Namely, $$(A+m\cdot p)\bmod R=(A+(A\cdot s \bmod R)\cdot p)\bmod R=A\cdot(1+s\cdot p)\bmod R=0.$$

Correspondingly, the sum $A+m\cdot p$ may be passed to a shifting sub-unit 340 that performs the division by radix R by shifting the sum $A+m\cdot p$ to the right by r bits (whose values are zero, by construction). All bits of the sum may be shifted with the exception of the sign bit, e.g., the most significant bit, with the second most significant bit acquiring value 0. In some implementations, the shifting sub-unit 340 and the rescaling sub-unit 310 may be combined into a single sub-unit (e.g., having one or more shift registers). The resulting Montgomery-reduced number $$A_M = \frac{a \cdot x + b \cdot y + m \cdot p}{R} \bmod p$$

is an integer within the target interval [−p, p−1] provided that a and b are appropriately bounded. More specifically, since a·x is defined on the interval [−a·p, a·p−1], b·y is defined on the interval [−b·p, b·p−1], and m·p is defined on the interval [−R·p/2, R·p/2−1], the resulting number $A_M$ is defined on interval [−c·p, c·p−1], where c=(R/2+a+b)/R. The number $A_M$ is, therefore, defined on the interval that does not exceed the target interval, provided that c≤1, implying that a+b≤R/2. This condition ensures that the output is within the target interval for any input numbers x and y. In some instances, additional information may be available about one or both of the inputs, x and y, and a less rigorous condition may suffice. For example, if y is known to be much smaller than R (e.g., smaller by at least factor of 8), e.g. if y is a small constant number, then it may suffice to choose any a<R/2. Likewise, if x is known to be 0, then the value b=R may be used.

In one implementation, radix R=4 and a=b=1; accordingly, $A_M$=(x+y)/4 mod p. In another implementation, R=16 and a=4, b=1; accordingly, $A_M$ (4x+y)/16 mod p. When radix R=16 is used and a combination (x/4+y/8) mod p is to be computed, this combination may be computed as (4x+2y)/16 mod p.

The Montgomery reduction techniques described above yield a sum (or difference) value $A_M$ that is within the target interval for all sign values of x and y. Consequently, the computation of the sum (or difference) may be started as soon as the low bits (e.g., one or more low words) of x and y become available (e.g., being output by a multiplication circuit) and before all bits of x and y are computed. For example, a 64-bit j-th word $A_1$ of $A_M$ may be computed as soon as 64-bit words $x_j$ and $y_j$ (of x and y, respectively) and the first $\log_2 R$ bits of each of $x_{j+1}$ and $y_{j+1}$ become available.

The Montgomery-reduced number $A_M$ may be provided to a scale-balanced processing 350. Scale-balanced processing 350 may be any collection of operations, e.g., multiplication, addition, etc., operations performed on various MUL units 220-*n*, ADD units 230-*n* (including sign-efficient ADD units), e.g., performed based on instructions from control unit 250. Scale-balanced processing 350 may be performed to ensure that the difference between $A_M$=(x+y)/R mod p and A=x+y mod p is compensated in the course of various operations being performed. Such operation may include, but need not be limited to, ECC operations in projective coordinates. As one illustrative non-limiting example, a cryptographic processor may perform a computation $$z = \frac{(x-y)^2}{x+y} \bmod p,$$

where x and y are outputs of multiplication operations (e.g., performed by MUL unit 220-1 and MUL unit 220-2). The cryptographic processor may use a sign-efficient ADD unit to use the Montgomery-reduced sum and difference, e.g., as described below (radix R=16 operations are illustrated):

TABLE 1

| |
|---|
| $u = \frac{1 \cdot x + 1 \cdot y}{16} \bmod p$ |
| $v = \frac{4 \cdot x - 4 \cdot y}{16} \bmod p$ |
| t = v · v mod p |
| $w = u^{-1} \bmod p$ |
| z = t · w mod p |

Example scale-balanced operations that use Montgomery addition/subtraction

Operations illustrated in Table 1 use balanced Montgomery-reduced addition and subtraction operations. Specifically, the addition operation is performed with a=b=1, and the subtraction operation is performed with a=b=4, resulting in the computation $$z = \frac{(x-y)^2/16}{(x+y)/16} \bmod p.$$

As another illustrative example, a cryptographic processor may perform a computation $$z = \frac{3}{2} x \cdot y + \frac{3}{4} y^2 \bmod p,$$

via the following sequence of operations (radix R=4 operations are illustrated):

TABLE 2

| |
|---|
| $u = \frac{x + 2 \cdot y}{4} \bmod p$ |
| $v = \frac{x - y}{4} \bmod p$ |
| t = u · u mod p |
| w = v · v mod p |
| $z' = \frac{t - w}{4} \bmod p$ |
| z = 16 · z' mod p |

Figure 4:
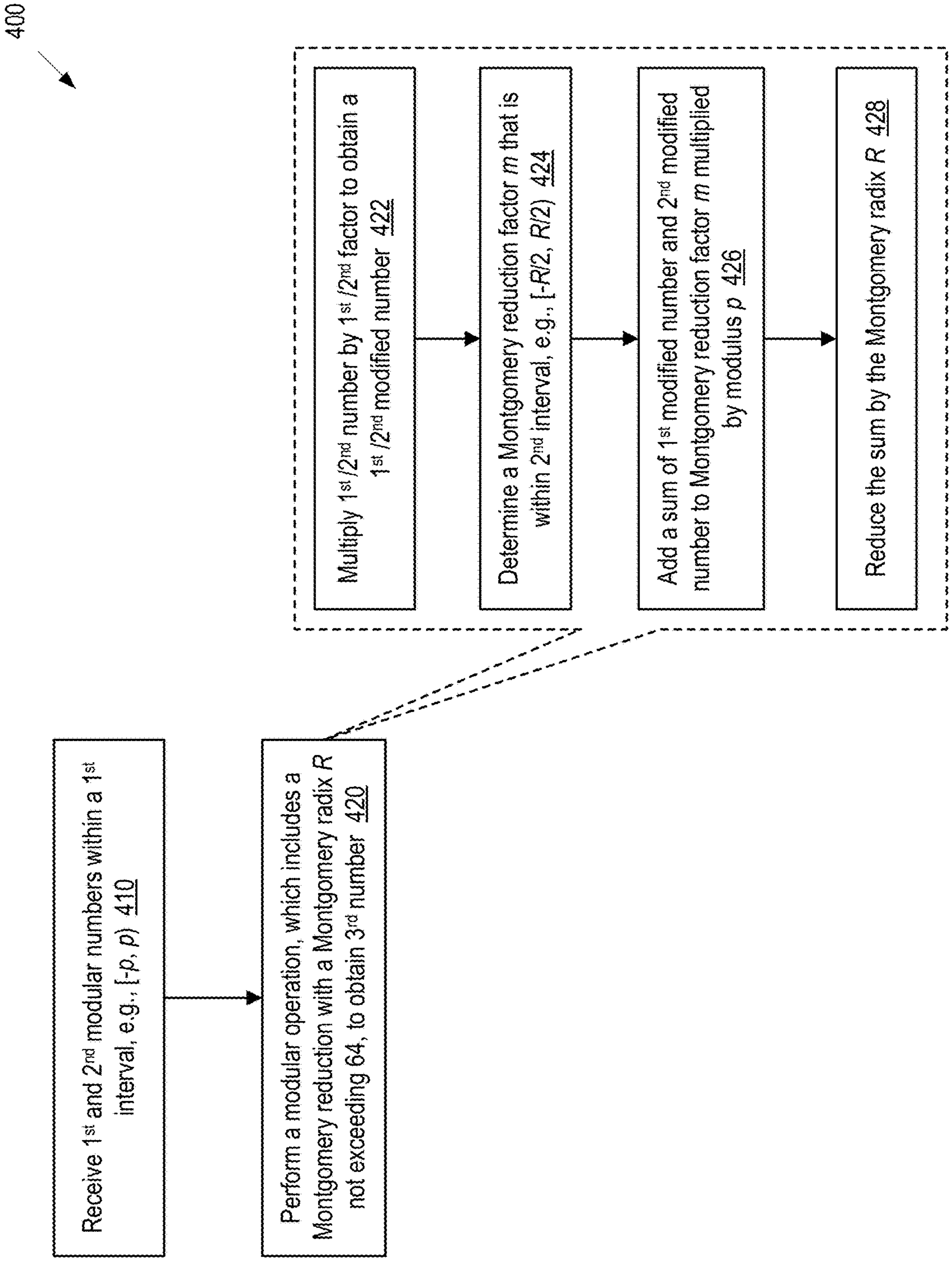
FIG. 4 is a flow diagram depicting method of sign-efficient addition or subtraction that uses Montgomery reduction, in accordance with some implementations of the present disclosure.

Another example of scale-balanced operations that use Montgomery addition/subtraction FIG. 4 is a flow diagram depicting method 400 of sign-efficient addition or subtraction that uses Montgomery reduction, in accordance with some implementations of the present disclosure. Method 400 and/or each of their individual functions, routines, subroutines, or operations may be performed by a cryptographic processor (accelerator), such as cryptographic engine 200 depicted in FIG. 2. Various blocks of method 400 may be performed in a different order compared with the order shown in FIG. 4. Some blocks may be performed concurrently with other blocks. Some blocks may be optional. Method 400 may be implemented as part of a cryptographic operation, which may involve a public key number and a private key number. The cryptographic operation may include RSA algorithm, an elliptic curve-based computation, or any other suitable operation.

A cryptographic processor that performs method 400 may include a plurality of two or more multiplication circuits (e.g., MUL units 220-*n*). The cryptographic processor may further include at least one addition circuit (e.g., ADD units 230-*n*). Some of the operations of the method 400 may be performed by a sign-efficient addition circuit (e.g., SE ADD unit 300 of FIG. 3). Each of the plurality of the addition circuits may be communicatively coupled (e.g., via one or more buses) to at least one of the multiplication circuits. In some implementations, each of the plurality of the addition circuits is coupled to all multiplication circuits. In some implementations, some or all of the multiplication circuits may be configured to perform modular multiplication and some or all of the addition circuits may be configured to perform modular addition. In some implementations, some or all of the multiplication circuits may be configured to perform Montgomery multiplication.

The cryptographic processor may further include a memory system having two or more memory units. Each of the memory units may be communicatively coupled to at least one of the multiplication circuits and at least one of the addition circuits. One or more of the memory units may be double-port memory units capable of performing a read operation and a write operation within a same cycle of cryptographic processor operations.

At block 410, one or more circuits (e.g., SE ADD unit 300) of the cryptographic processor performing method 400 may receive a first number (e.g., x) and a second number (e.g., y). The first number and the second number may be modular numbers within a first interval, e.g., an interval defined by a modulus p, such as the interval [0, 2p). In some implementations, the first interval includes negative numbers between zero and minus the modulus, e.g., the first interval may be [−p, p). (The terms "first" and "second," as used herein, should be understood as mere identifiers and may refer to any numbers, intervals, cycles, etc., and do not presuppose any functional or temporal order.) The first number and the second number may be large numbers, e.g., 128-bit numbers, 256-bit numbers, 1024 numbers, and the like. In some implementations, the modulus p may be an odd number. At least one of x or y (or both) may be obtained from one of the plurality of multiplication circuits of the cryptographic engine. In some implementations, each of the first number and the second number may include multiple words, e.g., 32-bit words, 64-bit words, and the like.

Each of the words of the first (and second) number may be received (e.g., by SE ADD unit 300) during a respective one of a plurality of computational cycles, starting with a word that includes the least significant bits of the first (second) number. For example, during the first cycle, SE ADD unit 300 may receive the lowest 64 bits (the first word) of the first number; during the second cycle, SE ADD unit 300 may receive the second lowest 64 bits (the second word) of the first number; and so on. The words may be received as soon as the computation of the respective word is completed (e.g., by the multiplication circuit) and before more significant words are computed.

At block 420, method 400 may continue with the one or more circuits (e.g., SE ADD unit 300) performing a modular operation. The modular operation may be based on the first number and the second number and may determine a third number using a Montgomery reduction, e.g., a number $(a \cdot x \pm b \cdot y)/R \bmod p$, where R is a Montgomery radix. In some implementations, the Montgomery radix R is a power-of-two number, e.g., 4, 8, 16, 32, not exceeding a number that can be stored in a single word (e.g., 64-bit word) of the first (and/or second) number. The third number $(a \cdot x \pm b \cdot y)/R \bmod p$ may be within the first interval [−p, p) and may represents a sum or a difference of a rescaled first number and a rescaled second number.

As illustrated by the blowout portion of FIG. 4, in some implementations, performance of the modular operation may include a number of multiplications, additions (subtractions), bit shifts, and so on. More specifically, at block 422, method 400 may include multiplying the first number x by a first factor a to obtain a first modified number $a \cdot x$. Similarly, method 400 may include multiplying the second number y by a second factor b to obtain a second modified number $\pm b \cdot y$. The first factor a and the second factor b may be power-of-two numbers (e.g., 1, 2, 4, 8, etc.) such that the sum a+b of the first factor and the second factor does not exceed the Montgomery radix R.

At block 424, method 400 may continue with determining a Montgomery reduction factor $m=(a \times b \cdot y) \cdot s \bmod R$ that is based on the first number and the second number and is within a second interval. In some implementations, the second interval includes negative numbers between zero and minus one half of the Montgomery radix, e.g., [−R/2, R/2). At block 426, method 400 may continue with the one or more circuits adding a sum of the first modified number and the second modified number, $a \times b \cdot y$, to a Montgomery reduction factor m multiplied by a modulus p of the modular operation: $a \times b \cdot y \pm m \cdot p$. It shall be understood that the term "sum" encompasses both the outputs of addition operations as well as subtraction operations. At block 428, method 400 may continue with reducing the output by the Montgomery radix R, e.g., by shifting the output to the right by $\log_2 R$ bits.

Figure 5:
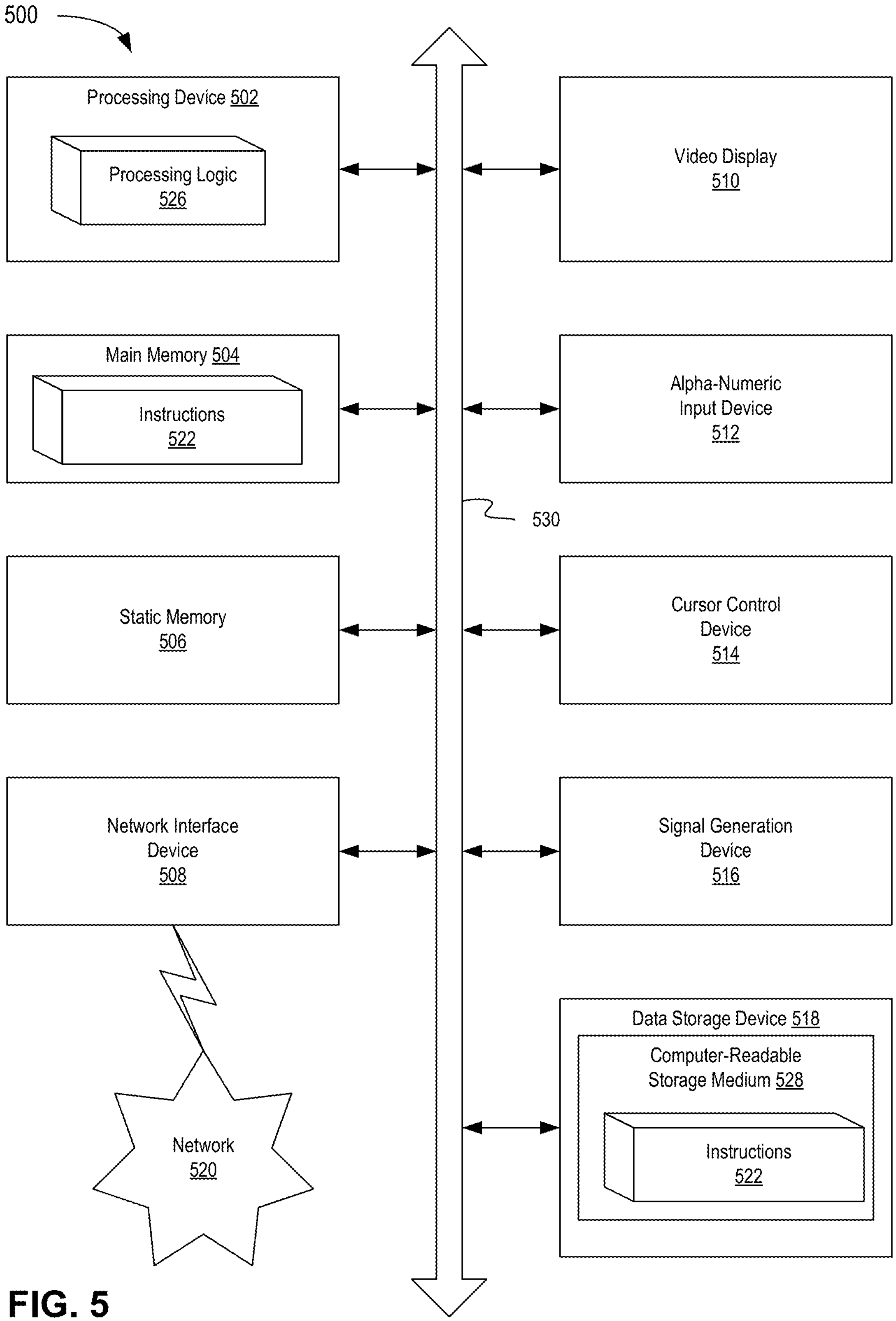
FIG. 5 depicts a block diagram of an example computer system in accordance with some implementations of the present disclosure.

FIG. 5 depicts a block diagram of an example computer system 500 operating in accordance with some implementations of the present disclosure. In various illustrative examples, example computer system 500 may be computer system 102, illustrated in FIG. 1. Example computer system 500 may be connected to other computer systems in a LAN, an intranet, an extranet, and/or the Internet. Computer system 500 may operate in the capacity of a server in a client-server network environment. Computer system 500 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 500 may include a processing device 502 (also referred to as a processor or CPU), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which may communicate with each other via a bus 530.

Processing device 502 represents one or more general-purpose processing devices such as a microprocessor, central processing unit, or the like. More particularly, processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 502 may be configured to execute instructions implementing method 400 of sign-efficient addition or subtraction that uses Montgomery reduction.

Example computer system 500 may further comprise a network interface device 508, which may be communicatively coupled to a network 520. Example computer system 500 may further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and an acoustic signal generation device 516 (e.g., a speaker).

Data storage device 518 may include a computer-readable storage medium (or, more specifically, a non-transitory computer-readable storage medium) 528 on which is stored one or more sets of executable instructions 522. In accordance with one or more aspects of the present disclosure, executable instructions 522 may comprise executable instructions implementing method 400 of sign-efficient addition or subtraction that uses Montgomery reduction.

Executable instructions 522 may also reside, completely or at least partially, within main memory 504 and/or within processing device 502 during execution thereof by example computer system 500, main memory 504 and processing device 502 also constituting computer-readable storage media. Executable instructions 522 may further be transmitted or received over a network via network interface device 508.

While the computer-readable storage medium 528 is shown in FIG. 5 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A cryptographic processor configured to perform a modular addition of a first number and a second number, the cryptographic processor comprising:

an addition circuit to compute a sum of the first number and the second number;

a multiplication circuit to compute a first multiplication product of (i) the sum of the first number and the second number and (ii) a number that is based on an inverse, modulo a radix number, modulus of the modular addition, the radix number being a power of two, $2^n$, with n not exceeding 6; and a bit-shifting circuit to bit-shift, by n bits, the sum of the first number and the second number modified using the first multiplication product to obtain an output of the modular addition.

2. The cryptographic processor of claim 1, wherein the modular addition is performed within an interval of numbers comprising at least negative numbers between zero and minus the modulus of the modular addition.

3. The cryptographic processor of claim 2, wherein the modulus of the modular addition is an odd number.

4. The cryptographic processor of claim 1, wherein the multiplication circuit is further to:

compute a second multiplication product of the first multiplication product and the modulus of the modular addition; and wherein the addition circuit is further to;

modify, using the second multiplication product, the sum of the first number and the second number.

5. The cryptographic processor of claim 1, further comprising a rescaling circuit to rescale at least one of the first number or the second number, using one or more rescaling factors.

6. The cryptographic processor of claim 5, wherein each of the one or more rescaling factors are power-of-two numbers.

7. The cryptographic processor of claim 5, wherein a sum of the one or more rescaling factors does not exceed the radix number.

8. The cryptographic processor of claim 1, wherein each of the first number and the second number are at least 128-bit numbers.

9. The cryptographic processor of claim 1, wherein the addition circuit is configured to receive each of a plurality of words of the first number during a respective one of a plurality of computational cycles, starting with a word comprising least significant bits of the first number.

10. The cryptographic processor of claim 9, wherein each received word comprises at least 32 bits.

11. The cryptographic processor of claim 1, further comprising a memory buffer storing, prior to the addition circuit computing the sum of the first number and the second number, one or more of:

the modulus of the modular addition, the radix number, or the number that is based on the inverse, modulo the radix number.

12. A cryptographic processor to perform a modular addition of a first number and a second number, the cryptographic processor comprising:

a first multiplication circuit configured to:

perform a multiplication operation to obtain the first number comprising a first plurality of multiple-bit words;

an addition circuit configured to receive from the first multiplication circuit, the first plurality of multiple-bit words of the first number in an order starting from a least significant word (LSW) of the first number, wherein a sign of the first number is determined by a most significant word (MSW) of the first number;

obtain the second number comprising a second plurality of multiple-bit words of the second number in the order starting from an LSW of the second number, wherein a sign of the second number is determined by an MSW of the second number; and compute a sum of the first number and the second number;

a second multiplication circuit to compute a first multiplication product of (i) the sum of the first number and the second number and (ii) a number that is based on an inverse, modulo a radix number, modulus of the modular addition, the radix number being a power of two, $2^n$, with n not exceeding 6; and a bit-shifting circuit to bit-shift, by n bits, the sum of the first number and the second number modified using the first multiplication product to obtain an output of the modular addition, wherein the number that is based on the inverse on the modulus of the modular addition is selected to determine an LSW of the output of the modular addition based on the LSW of the first number and the LSW of the second number before a sign of the output of the modular addition is determined.

13. The cryptographic processor of claim 12, wherein the second number is obtained using at least one of:

an additional multiplication operation, or accessing a memory of the cryptographic processor.

14. A method to perform a modular addition of a first number and a second number, the method comprising:

computing, by an addition circuit, a sum of the first number and the second number;

computing, by a multiplication circuit, a first multiplication product of (i) the sum of the first number and the second number and (ii) a number that is based on an inverse, modulo a radix number, modulus of the modular addition, the radix number being a power of two, $2^n$, with n not exceeding 6; and bit-shifting by n bits, using a bit-shifting circuit, the sum of the first number and the second number modified using the first multiplication product to obtain an output of the modular addition.

15. The method of claim 14, wherein the modular addition is performed within an interval of numbers comprising at least negative numbers between zero and minus the modulus of the modular addition, and wherein the modulus of the modular addition is an odd number.

16. The method of claim 14, further comprising:

computing, by the multiplication circuit, a second multiplication product of the first multiplication product and the modulus of the modular addition; and modifying, by the addition circuit and using the second multiplication product, the sum of the first number and the second number.

17. The method of claim 14, further comprising:

rescaling, by a rescaling circuit, at least one of the first number or the second number using one or more rescaling factor.

18. The method of claim 17, wherein each of the one or more rescaling factors are power-of-two numbers, wherein a sum of the one or more rescaling factors does not exceed the radix number, and wherein each of the first number and the second number are at least 128-bit numbers.

19. The method of claim 14, wherein a plurality of words of the first number is received by the addition circuit during a respective one of a plurality of computational cycles, starting with a word comprising least significant bits of the first number, wherein each received word comprises at least 32 bits.

20. The method of claim 19, wherein each of the plurality of words of the first number comprises a sign bit, wherein the sign bit is a least significant bit of a word of a higher, than a respective received word, significance.

* * * * *